US008234357B2

(12) United States Patent
De Groot

(10) Patent No.: US 8,234,357 B2
(45) Date of Patent: Jul. 31, 2012

(54) METHOD FOR SERVICING FIELD DEVICES OF PROCESS AUTOMATION TECHNOLOGY UTILIZING A DEVICE-INDEPENDENT OPERATING PROGRAM

(75) Inventor: Vincent De Groot, St. Louis (FR)

(73) Assignee: Endress + Hauser Process Solutions AG, Reinach (CH)

( * ) Notice: Subject to any disclaimer, the term of this patent is extended or adjusted under 35 U.S.C. 154(b) by 0 days.

(21) Appl. No.: 12/735,973

(22) PCT Filed: Oct. 1, 2008

(86) PCT No.: PCT/EP2008/063183
§ 371 (c)(1),
(2), (4) Date: Jun. 6, 2011

(87) PCT Pub. No.: WO2009/047193
PCT Pub. Date: Apr. 16, 2009

(65) Prior Publication Data
US 2011/0231531 A1    Sep. 22, 2011

(51) Int. Cl.
*G06F 15/177* (2006.01)
(52) U.S. Cl. .......................... 709/221; 709/220; 709/222
(58) Field of Classification Search ........... 709/220–222
See application file for complete search history.

(56) References Cited

U.S. PATENT DOCUMENTS

| | | | |
|---|---|---|---|
| 7,120,391 B2* | 10/2006 | Stengele et al. | 455/41.3 |
| 7,941,581 B2* | 5/2011 | Schwalbe et al. | 710/105 |
| 2002/0004370 A1* | 1/2002 | Stengele et al. | 455/39 |
| 2007/0078956 A1* | 4/2007 | VanGompel | 709/220 |
| 2009/0157925 A1* | 6/2009 | Schwalbe et al. | 710/105 |
| 2009/0177970 A1* | 7/2009 | Jahl et al. | 715/735 |
| 2009/0234465 A1* | 9/2009 | Korsten | 700/17 |
| 2009/0326852 A1* | 12/2009 | Vetter et al. | 702/108 |
| 2011/0125295 A1* | 5/2011 | Bednasch et al. | 700/83 |

FOREIGN PATENT DOCUMENTS

| | | |
|---|---|---|
| WO | WO 03/029907 A1 | 4/2003 |
| WO | WO 03/445608 A2 | 5/2003 |
| WO | WO 2004/046837 A1 | 6/2004 |

OTHER PUBLICATIONS

"Profibus Technology and Application System Description", Profibus Technology and Application, Oct. 2002, XP002272347.
Martin Wollschlaeger "Handling Field Device Documentation throughout the Life Cycle of Automation Systems-Web-Based Information Model and Access Methods", IEEE International Conf. on Industrial Informatics, Aug. 2006.
Martin Wollschlaeger, "Common Model and Infrastructure for Application of XML within the Automation Domain", $3^{rd}$ IEEE International Conf. Aug. 2005.
Martin Wollschlaeger, "An Information Model for Life Cycle Support of Field Device Related Documents", IEEE International Workshop on Factory Communication Systems, Jun. 27, 2006.
Ivica Crnkovic, "A Case Study: Demands on Component-Based Development", Conference on Software Engineering, Jun. 2000.

* cited by examiner

*Primary Examiner* — Mohamed Wasel
(74) *Attorney, Agent, or Firm* — Bacon & Thomas, PLLC

(57) ABSTRACT

A method for servicing field devices of process automation technology utilizing a device-independent operating program SP running in a computer unit CU and requiring device-specific description files DD1-DD6 for accessing parameters and/or functions of field devices F1-F6, wherein the device-specific description files must be processed by a preprocessing program, during run time of the operating program SP, that preprocessing program IP1 or IP2 is called, which was successfully tested with the corresponding description file DD1-DD6.

3 Claims, 2 Drawing Sheets

METHOD FOR SERVICING FIELD DEVICES OF PROCESS AUTOMATION TECHNOLOGY UTILIZING A DEVICE-INDEPENDENT OPERATING PROGRAM

TECHNICAL FIELD

The invention relates to a method for servicing field devices of process automation technology utilizing a device-independent operating program.

BACKGROUND DISCUSSION

In process automation technology, field devices are often applied, which serve for registering and/or influencing of process variables. Examples of such field devices are fill level measuring devices, mass flow measuring devices, pressure and temperature measuring devices, etc., which register with corresponding sensors the process variables, fill level, flow, or temperature.

Serving for influencing process variables are so-called actuators, which, for example, in the case of valves, influence the flow of a liquid in a pipeline section, or, in the case of pumps, influence the fill level in a container.

Various field devices of such a sort are produced and sold by the members of the firm, Endress+Hauser.

As a rule, in modern automation technology plants, field devices are connected via fieldbus systems (HART, Profibus, Foundation Fieldbus) with superordinated units. These superordinated units serve, among other things, for process control or process visualizing.

Besides process control and process visualizing, fieldbus systems also serve for monitoring process plants. Monitoring of a plant can occur, for example, with the assistance of a corresponding process control unit (for example, Simatic S7 of Siemens). Process control units obtain plant-relevant data via telegrams, which are transmitted over the fieldbus in the course of regular (cyclic/scheduled) data traffic.

Fieldbus systems are, in given cases, integrated into enterprise networks, which work on the basis of Ethernet. Process or field device data can therewith be accessed from various areas of a company.

For worldwide communication, company networks can also be connected with public networks, e.g. the internet.

For servicing the field devices, corresponding operating programs are necessary. These operating programs can run self-sufficiently in a superordinated unit (FieldCare, Endress+Hauser; Pactware; AMS, Emerson; Simatic PDM, Siemens), but they can also be integrated into control system applications (Simile PCS7, Siemens; ABB Symphony; Delta V, Emerson).

The user would like to be able to service as many field devices as possible in the plant with a single operating program. Device-specific, especially manufacturer-specific solutions, for servicing are no longer accepted by users in this area of automation technology. Since the operating program does not know the parameters and the functionalities of a field device beforehand, these must be made known to the operating program. This occurs via device description files, which are made available by the field device manufacturers. As a rule, the current versions of the device description files are downloaded by the user via the Internet.

Device description files are not executable programs or program parts, and therefore also cannot directly be integrated into an operating program. They require an interpreter program, which is called up via the operating program and communicates with the operating program. The interpreter program interprets the device description file, and delivers to the operating program the needed information as parameters and/or functions of the field device. In given cases, device-specific graphical representations, which facilitate the servicing, are also delivered from the device description file.

In order to assure a safe servicing of the field devices, the device description files must be tested individually with the interpreter programs. Problematic in such case, however, is that the interpreter programs continue to be developed, and, so, are available in different versions.

Even though a device description file was successfully tested with an interpreter program, e.g. version 1.0, it is not automatically assured that the same device description file will also successfully run in a newer version 2.0 of the same interpreter program.

When a field device must be serviced, and the operating program does not permit an accessing of the parameters and functions of the field device because of problems concerning the interaction of the device description and interpreter program, this can prove very bothersome or unacceptable for the user. In the extreme case, these problems can lead to a plant shutdown of the entire process installation, which can result in considerable financial loss for the operator of the process installation.

SUMMARY OF THE INVENTION

An object of the invention, therefore, is to provide a method for servicing field devices of process automation technology utilizing a device-independent operating program, which does not have the above named disadvantages, and which enables especially a simple and safe servicing of field devices.

A method for servicing field devices of process automation technology utilizing a device-independent operating program running in a computer unit and requiring device-specific description files for accessing parameters and/or functions of field devices, wherein the device-specific description files are called during run time of the operating program via a preprocessing program and are stored in the computer unit, characterized by method steps as follows.

Storing first and second preprocessing programs in the computer unit; connecting the computer unit with a field device to be serviced; loading the device-independent operating program; selecting the field device to be serviced in the operating program; calling the device-specific description file of the field device to be serviced via the operating program through the preprocessing program associated with the device-specific description file; and changing parameters of the field device by means of the operating program.

An essential idea of the invention is always to call that preprocessing program, which was successfully tested with the corresponding description file. Problems due to different versions of the preprocessing program can then no longer occur.

The preprocessing program can be an interpreter program. The device-specific description file can be a device description file. The method is therewith suitable for known device descriptions for field devices.

The association between the preprocessing program and device-specific description file occurs via a version number of the description file. On the basis of the version number of the device description file, it can be derived when the device description file was created, and with which version of the preprocessing program it was tested.

BRIEF DESCRIPTION OF THE DRAWINGS

The invention will now be explained in greater detail on the basis of an example of an embodiment presented in the drawing, the figures of which show as follows.

DETAILED DISCUSSION IN CONJUNCTION WITH THE DRAWINGS

Figure 1:
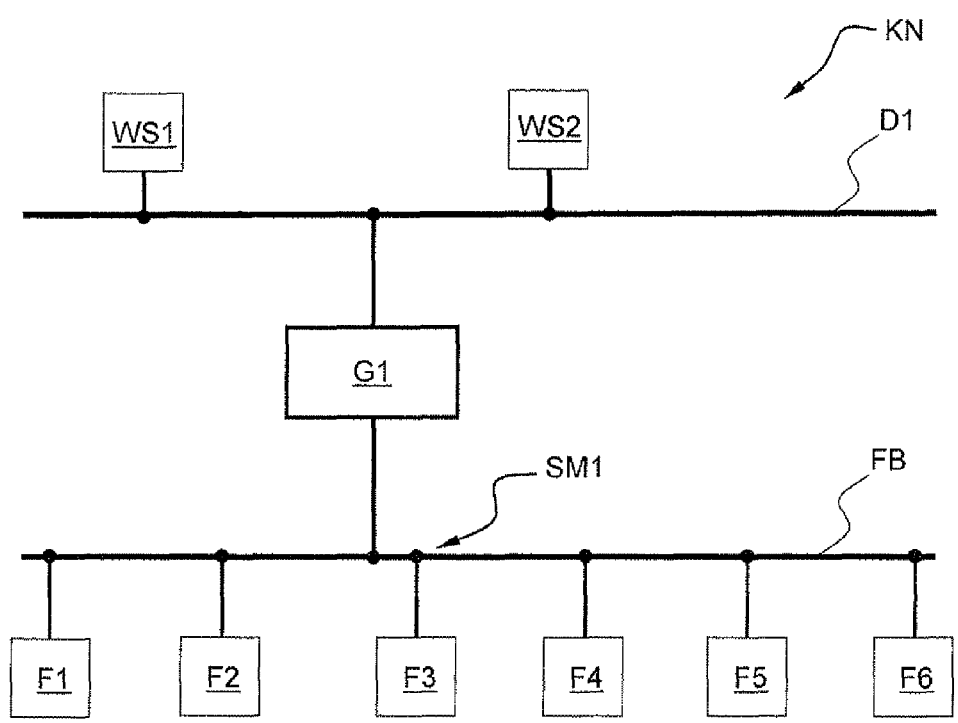
FIG. 1 is a schematic drawing of a fieldbus system.

FIG. 1 shows a fieldbus system with a communication network KN of automation technology in greater detail. Connected to a data bus D1 are a number of computer units (workstations) WS1, WS2. These computer units serve as superordinated units (control systems or control units) for process visualizing, process monitoring and for engineering as well as for servicing and monitoring field devices. Data bus D1 works, for example, according to the Profibus DP standard or according to the HSE (High Speed Ethernet) standard of Foundation Fieldbus. Via a gateway G1, which is also referred to as a linking device or as a segment coupler, the data bus D1 is connected with a fieldbus segment SM1. Fieldbus segment SM1 is composed of a plurality of field devices F1, F2, F3, F4, F5, F6, which are connected with one another via a fieldbus FB. Field devices F1, F2, F3, F4, F5, F6 comprise sensors as well as actuators. Fieldbus FB works according to one of the known fieldbus standards, Profibus, Foundation Fieldbus or HART.

Figure 2A:
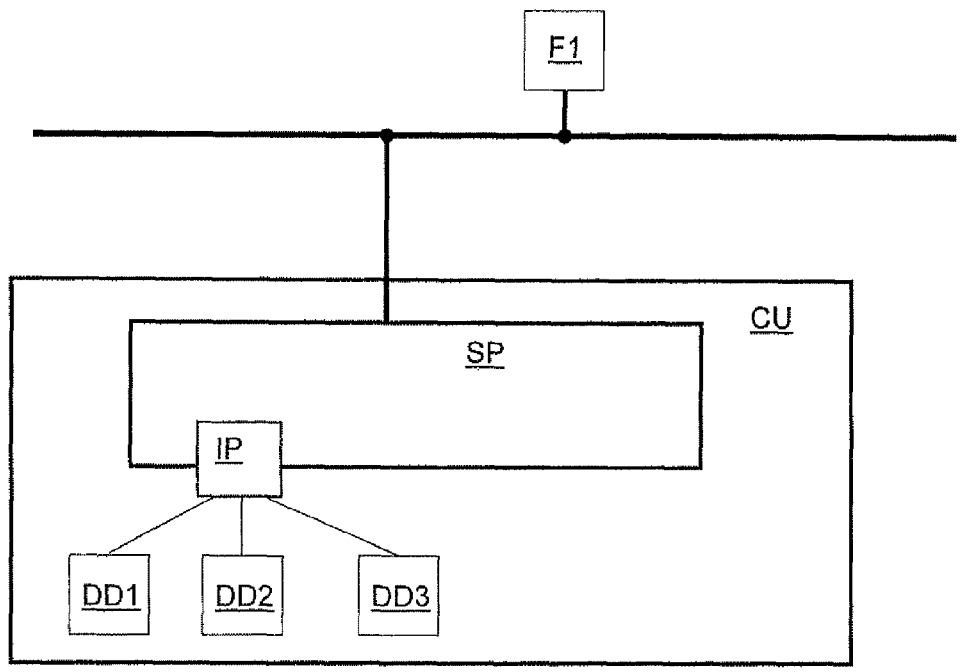
FIG. 2a is a schematic drawing of an operating program with a conventional interpreter program.

FIG. 2a shows, in greater detail, a computer unit CU with a device-independent operating program SP for servicing a field device F1 Stored in the computer unit CU are a number of device-specific description files DD1, DD2, DD3. As a rule, a plurality of device description files, sometimes over 100, are stored in the computer unit CU.

With help of these description files, which are created, for example, in a standardized language—for example, DDL (device description language) or EDDL (electronic device description language)—the parameters and/or the functionality of individual field devices are made known to the operating program SP. The device description files cannot be called directly by the operating program SP, but, instead, for this, an interpreter program IP in the form of a preprocessing program is necessary. This interpreter program IP always interprets the individual description files DD1, DD2, DD3 during run time of the operating program SP, when information from these files is required.

For the computer unit CU to communicate with a field device, a connection of the computer unit CU with the field device must be produced. This can occur through a direct connection to the field device or via the fieldbus FB.

The user can select a field device, which the user would like to service, for example, field device F1, via a selection menu, which is presented on a graphic user interface of the operating program SP. The selection menu can comprise, for example, a "life list", e.g. a list of all field devices currently addressable via the fieldbus. A life list is only obtainable when the computer unit CU is connected to the fieldbus FB. After selection of the field device F1, the description file DD1 for this field device is called via the interpreter program IP, and the corresponding parameters, which can be serviced, are presented on a graphic user interface. Besides the pure parameter values, selection menus for individual parameters are also frequently presented. In the description file DD1, dependencies between individual parameters are also stored. If, for example, a parameter which concerns the physical unit with which the field device F1 works is modified, for example, from "meters" to "feet", all parameters which were previously defined in meters must then automatically be converted to the new unit "feet".

Via the operating program SP, parameters can thus be called from the field device F1, or parameters can be changed in the field device F1. Likewise, particular functions (linearizing, graphing, data-logging) of the field device F1 can be called by the operating program SP.

Figure 2B:
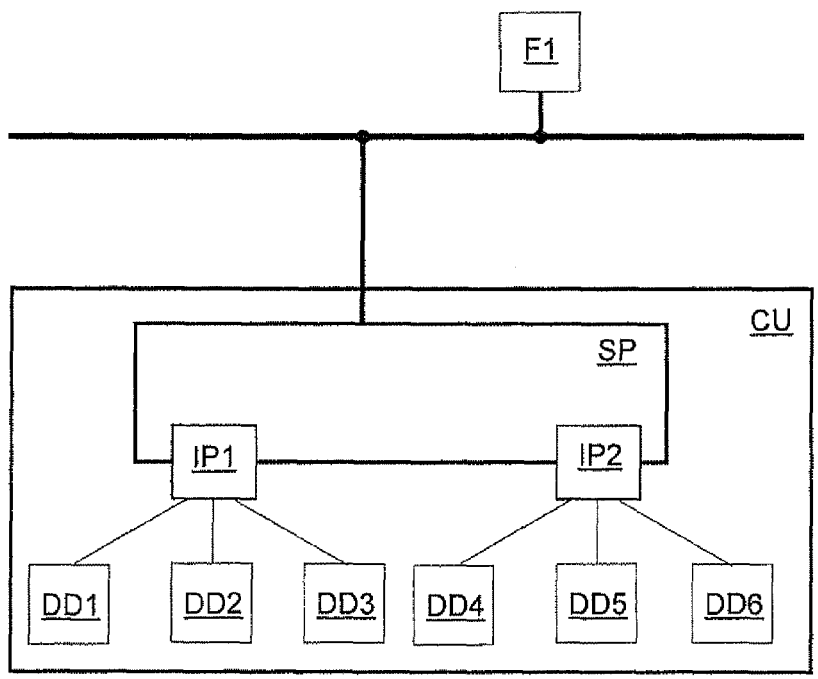
FIG. 2b is a schematic drawing of an operating program with two interpreter programs according to the invention.

Alternatively, FIG. 2b shows, in greater detail, the computer unit CU with an operating program SP and, according to the invention, two interpreter programs IP1, IP2. The program IP1 corresponds to the interpreter program IP of FIG. 2a. It is an older software version of the interpreter program IP, and, for example, is referred to as Version 1.0.

The interpreter program IP2 is a newer software version of the interpreter program IP, and is referred to as Version 2.0.

FIG. 2b shows two groups of device description files. The one group DD1-DD3 was successfully tested with the first interpreter program IP1, while the second group DD4-DD6 was successfully tested with the second interpreter program IP2.

The method of the invention is conceived in such a manner, that that version of the interpreter program always interacts with the corresponding device description file, with which it was successfully tested.

The method of the invention will now be described in more detail.

For servicing field devices of process automation technology, a device-independent operating program SP is required. This operating program runs in the computer unit CU. For accessing parameters and/or functions of the field devices F1-F6, the operating program SP in each case requires a device-specific description file DD1-DD6 for the field device in question. This description file is called during run time of the operating program SP via a preprocessing program IP. The description files DD1-DD6 are stored in the computer unit CU. According to the invention, a first and a second preprocessing program IP1, IP2 are stored in the computer unit CU. After connection of the computer unit CU with the field device F1-F6 to be serviced—for example, via the fieldbus FB—a data exchange between the computer unit CU and the desired field device F1-F6 is, in principle, possible. For servicing, the device-independent operating program SP must be loaded in the computer unit CU.

On the screen of the computer unit CU, there appears a graphical user interface, via which the field devices F1-F6 to be serviced can be selected. After this, the device-specific description file—for example, DD1—of the field device to be serviced—for example, F1—is called via the operating program SP through the preprocessing program IP1, which is associated with the device-specific description file DD1. Therewith, for example, parameters of the field device F1 can be changed by means of the operating program SP.

The selection of the interpreter program IP1 can occur, for example, via the version number of the device description file DD1.

In addition to interpreter programs, other preprocessing programs for device descriptions are also options. The invention is not limited to known device description files, but, instead, is suitable for any device-specific description files.

The invention claimed is:

1. A method for servicing field devices of process automation technology utilizing a device-independent operating program SP running in a computer unit CU and requiring device-specific description files DD1-DD6 for accessing parameters and/or functions of field devices F1-F6, wherein the device-specific description files are called during run time of the operating program SP via a preprocessing program and are stored in the computer unit CU, comprising the steps of:

- storing first and second preprocessing programs IP1, IP2 in the computer unit CU;
- connecting the computer unit CU with the field device F1-F6 to be serviced;
- loading the device-independent operating program SP;
- selecting the field device F1-F6 to be serviced in the operating program SP;
- calling the device-specific description file DD1-DD6 of the field device F1-F6 to be serviced via the operating program SP through the preprocessing program IP1 or IP2 associated with the device-specific description file DD1-DD6; and
- changing parameters of the field device F1-F6 by means of the operating program SP, wherein:
- the preprocessing programs IP1, IP2 are interpreter programs; and
- the interpreter programs interpret the device-specific description files DD1-DD6 during run time of the operating program SP, when information from these files is required.

2. The method as claimed in claim 1, wherein:
the device-specific description file DD1-DD6 is a device description file.

3. The method as claimed in claim 2, wherein:
association between preprocessing program IP1, IP2 and device-specific description file DD1-DD6 occurs via a version number of the description file DD1-DD6.

* * * * *